United States Patent
Bijl et al.

(10) Patent No.: US 10,769,959 B2
(45) Date of Patent: Sep. 8, 2020

(54) NIGHT VISION GOGGLES AIDED FLIGHT SIMULATOR SYSTEM AND METHOD

(71) Applicant: Nederlandse Organisatie voor toegepast-natuurwetenschappelijk onderzoek TNO, 's-Gravenhage (NL)

(72) Inventors: Pieter Bijl, 's-Gravenhage (NL); Frank Leonard Kooi, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 380 days.

(21) Appl. No.: 15/760,922

(22) PCT Filed: Sep. 16, 2016

(86) PCT No.: PCT/NL2016/050639
§ 371 (c)(1),
(2) Date: Mar. 16, 2018

(87) PCT Pub. No.: WO2017/048125
PCT Pub. Date: Mar. 23, 2017

(65) Prior Publication Data
US 2018/0261121 A1 Sep. 13, 2018

(30) Foreign Application Priority Data
Sep. 18, 2015 (EP) .................................. 15185937

(51) Int. Cl.
*G09B 9/36* (2006.01)
*G09B 9/30* (2006.01)

(52) U.S. Cl.
CPC ............... *G09B 9/36* (2013.01); *G09B 9/301* (2013.01)

(58) Field of Classification Search
CPC .......... G09B 9/30; G09B 9/301; G09B 9/307; G09B 9/32; G09B 9/36
See application file for complete search history.

(56) References Cited

U.S. PATENT DOCUMENTS

| 5,420,414 A | 5/1995 | Wentworth |
| 5,473,472 A | 12/1995 | Temme et al. |

(Continued)

FOREIGN PATENT DOCUMENTS

| EP | 1288699 A2 | 3/2003 |
| WO | WO 2010/056702 A1 | 5/2010 |

OTHER PUBLICATIONS

Gaylord, "Issues in Defense Training Systems Immersive Displays," Proc. of SPIE, vol. 6225, Archive 000109317, pp. 62250O-1 to 62250O-7 (2006).

(Continued)

*Primary Examiner* — Timothy A Musselman
(74) *Attorney, Agent, or Firm* — Leydig, Voit & Mayer, Ltd.

(57) ABSTRACT

A night vision goggles aided flight simulator system (100) and method for simulating night flight operations. The system comprises a computer (5) programmed with flight simulator software to calculate a flight simulator image (A1,A2); a projection screen (1) configured to receive the flight simulator image (A1,A2); a light projector (2) configured to project the flight simulator image (A1,A2) onto the projection screen (1); and a view tracking device (3) configured to measure a viewing vector (V) of a night vision device (4). The system (100) is configured to mask the projected flight simulator image (A1,A2) as a function of the measured viewing vector (V).

15 Claims, 2 Drawing Sheets

(56) References Cited

U.S. PATENT DOCUMENTS

| | | |
|---|---|---|
| 6,196,845 B1 | 3/2001 | Streid |
| 6,827,577 B1 * | 12/2004 | Fulbrook ............... G09B 9/307 359/410 |
| 2002/0130982 A1 * | 9/2002 | Marshall .............. G02B 23/125 349/15 |
| 2003/0091961 A1 | 5/2003 | Swaine et al. |
| 2007/0141538 A1 | 6/2007 | Quinn et al. |
| 2009/0253104 A1 | 10/2009 | Burggraf et al. |

OTHER PUBLICATIONS

Hogervorst et al., "NVG-the-Day: towards realistic night-vision training," Optomechatronic Micro/Nano Devices and Components III, Proc. of SPIE, vol. 9249, pp. 92490P-1 to 92490P-10 (2014).
European Patent Office, International Search Report in corresponding International Application No. PCT/NL2016/050639 dated Dec. 7, 2016 (3 pages).

* cited by examiner

NIGHT VISION GOGGLES AIDED FLIGHT SIMULATOR SYSTEM AND METHOD

CROSS-REFERENCE TO RELATED APPLICATIONS

This patent application is a U.S. National Phase of PCT International Application No. PCT/NL2016/050639, filed Sep. 16, 2016, which claims priority to European Application No. 15185937.8, filed Sep. 18, 2015, which are both expressly incorporated by reference in their entireties, including any references contained therein.

TECHNICAL FIELD AND BACKGROUND

The present disclosure relates to a night vision goggles aided flight simulator system and method for simulating night flight operations.

Traditional Night vision goggles (NVGs) and sensors like CCD and/or short wave infrared (SWIR) e.g. up to 2200 nm offer the opportunity to extend flight operations to the night. However, besides the usual costs of training during real flight, night flights pose additional restrictions. For example, in mid-summer it may not turn completely dark everywhere, the risk of crashing the airplane is higher than usual, the number of night-time flying hours in urban areas is limited to minimize sleep disturbance, and keeping the airport open outside regular hours introduces substantial financial costs. Accordingly, there is a need for NVG capable simulators to do NVG mission rehearsal and to familiarize flight-personnel with the fundamental and oftentimes surprising NVG visual illusions. The goal of a so-called "Level D" NVG simulator is to minimize the differences to the real world such that a user, e.g. pilot, can complete most of his training in the simulator.

In the real world, NVGs enhance the visibility of otherwise dark objects, but the NVG image is both i) degraded compared to and ii) different from the corresponding day view image. In addition, NVGs typically cause visual illusions that do not occur during the day. Because visual illusions are by definition difficult to distinguish, they are a prime cause for spatial disorientation and therefore of particular importance in NVG training. For example, NVG images usually represent luminous objects with bright circles around them, called halos. The size of these halos is typically independent of the distance to the bright object, and can therefore not be used as a distance cue. In addition, halos wash out all details in the direct surrounding of the bright object. Another example of an artefact is the so-called 'chlorofyll effect': grass and tree leaves appear particularly bright in an NVG image due to the high reflectance of chlorofyll in the near-infrared (NIR) region where the NVG has its highest sensitivity. While NVG simulated imagery may be generated in software using a dedicated head mounted display (HMD), it is desirable that a user can experience the simulation with the actual functioning NVGs to increase realism. However, simulating artefacts such as halos and realistic shadows with a simulation approach using actual NVGs in the simulator (so-called "NVG stimulation"), is difficult because it requires reproduction of extremely high contrasts encountered at night (e.g. cultural lights versus the rest of the world).

For example, U.S. Pat. No. 5,380,204 describes a currently used technique and system for night vision goggle aided flight simulation that allows a flight simulator operator wearing night vision goggles to view an approximate simulation of night vision goggle aided flight. A processor generates at least one look-up table of brightness values utilizing database sources including any selected options. A scene generation computer will then generate the scene image with the contrast based on values provided by the look-up table. An image display system displays the scene at light levels with sufficient dynamic range so that approximate simulation of night vision goggle aided flight is achieved. A neutral density filter can be placed over a CRT display if the CRT display as the display system cannot produce sufficient dynamic range.

For example, U.S. Pat. No. 6,196,845 B1 describes a visual display system and method for stimulation of night vision goggles using CRT displays. The display system includes a high resolution head tracked area of interest display for a rear projection video display. The system time multiplexes the display of raster and calligraphic images in the area of interest. The system also includes a method of calligraphic light point projection that conserves power by using a head tracked slow speed high sensitivity electromagnetic deflection system to position an electron beam which is modulated in X-Y position in a calligraphic fashion by a high speed secondary yoke to create intense light point images for the area of interest display.

However, the known methods are found to provide insufficient realism when used with dome based projection systems because the effective contrast generated is too low. There is yet a need for a (dome) projection based NVG aided flight simulation which includes the high dynamic range artefacts which occur in actual NVGs, such as bright light sources and dark shading.

SUMMARY

The need mentioned above and other needs may be met by aspects of the present disclosure providing a flight simulator system, method, and software adapted for simulating NVG aided night flight operations. In some embodiments the system comprises a computer that is programmed with flight simulator software to calculate a flight simulator image. A light projector is configured to project the flight simulator image onto a projection screen and a view tracking device is configured to measure a viewing vector of the night vision goggles. In a particular aspect, the projected flight simulator image is masked as function of the measured viewing vector.

By masking the projected flight simulator image outside the viewing vector and corresponding area, the projected image can be adapted to follow the user's gaze on the projection screen. This allows greater flexibility in providing the user with different images depending on his point of view. By dividing the projected flight simulator image into a central part that is in a field of view according to the viewing vector, and a peripheral part that is outside the field of view, these images can be treated differently. This allows the user to view a different type of image through the NVGs compared to outside the NVG. By reducing the brightness (i.e. luminance) of the peripheral part relative to the central part, the total amount of light projected on the curved screen will be reduced. Similarly, brightness in a central part of the image can be increased with respect to the intended brightness and subsequently reduced back to the intended brightness by filtering in front of the night vision goggles, e.g. using a perforated plate having a small aperture or other light filter, e.g. (infra)red filter reducing brightness (at least in the intended wavelength range viewed by the NVG) by a factor ten or more, or even a factor hundred or more.

One benefit of this technique is that it allows the generation of increased contrast of the image viewed through the NVG by suppressing the stray light coming from the peripheral image parts. A further benefit is the possibility to generate a dual view image with the same set of, for example RGB, projectors: a particular NVG image inside its field of view (FOV) and a visual image outside the FOV for e.g. pilots looking underneath their goggles. In current dual view simulators, the goggle image is typically generated with NIR projector systems.

For example, in modern flight simulators, the image is projected onto a dome surrounding the user. The dome is typically coated with (grey) paint having sufficient reflectivity to provide adequate light for day-time simulation. However, the reflectivity will result in back-scatter that reduces the image contrast. The reduced contrast will hamper simulation of objects such as halos and shadows. By reducing the total amount of light (particularly in the parts of the image not viewed through the NVGs), the amount of backscatter can be reduced, leading to increased contrast. Accordingly, the addition of a head (orientation) tracker allows a simulator system for day-time flights to be easily adapted for NVG aided night-flight simulation.

By controlling the one or more light projectors to selectively project the flight simulator image with reduced brightness in a peripheral part outside the NVG field of view, less scatter light may be produced. By calculating a boundary separating the central and peripheral parts as a function of the measured viewing vector and a predefined field of view, the images can be adapted to follow the perimeter of the NVGs. The viewing vector may be defined e.g. as a vector along the centre of the night vision device. The NVG field of view typically comprises a radial area around the viewing vector. By adjusting the radial extent of the field of view in the flight simulator software, the extent of the projected images can be tuned according to the NVG FOV. The radius of the field of view need not be constant around the central viewing vector. For example, the field of view can be oval or square, e.g. for a digital viewing device. For example, the projected image may be determined by measuring the viewing vector with respect to the projection screen. Alternatively, or in addition, both a vector (angle or direction) and position (e.g. origin) of the NVG may be measured to allow calculating what part of the projection screen is in the field of view of the user.

The user's field of view may be restricted by the particular night vision device used. Accordingly, the projected flight simulator image can be divided in a central part that is inside an area corresponding to the field of view of the night vision device and a peripheral part that is outside the field of view of the night vision device. For example, the field of view is between twenty and sixty degrees e.g. forty degrees. In principle, the present disclosure can be adapted to any head-mounted viewing device/sensor. The present systems are particularly suitable to work with a binocular or bi-ocular night vision goggles (NVG) restricting the user's field of view in both eyes. In some embodiments, while the front view is restricted, the user may also view below the device, e.g. to inspect the cockpit instruments. When a binocular or bi-ocular device is used, this allows to project a (visible or near IR) image inside the field of view which is only viewed through the NVGs. Accordingly, the projectors can be visible light projectors, i.e. without near IR. For example, the flight simulator software is configured to simulate a near-infrared image as viewed through the night vision device by generating a flight simulator image comprising e.g. red visible light. For example, a lookup table is used to convert the scene to a near-infrared equivalent, as seen through the NVGs.

Alternatively, or in addition, a monocular viewing device can be used, restricting the view only in one eye, e.g. in combination with a visible+near-infrared projector since the other 'free' eye will not detect the infrared image. Also in that case, the present methods and systems may provide increased contrast by suppressing scatter light from peripheral parts of the image.

The tracking device may be integrated or separate from the NVGs. By using a head tracking device to measure the viewing vector of the user's head, also the view vector of the NVG may be determined. The NVGs are typically worn on the user's head, e.g. mounted on a helmet that has a fixed orientation with respect to the user's head. By mounting the tracking device on the helmet or other head-worn device, the measured vector and positon of the device can be converted to the position and vector of the NVG. By providing the tracking device with wireless technology, the user can move his head more freely, and this is more in correspondence with the real flight situation. Also wiring may be used. Also other types of tracking devices not mounted to the helmet but e.g. based on external sensors or cameras recording the users head can be used to measure the viewing vector.

When a system is used that allows both day- and night-flight simulation, it is desirable that the light projectors have sufficient bit depth or dynamic range to provide desired details even when low light intensities are enhanced by the NVGs. For example, ten-bit light projectors or higher may be suitable. Alternatively, or in addition, the projected light can be attenuated before it enters the NVGs to increase the dynamic range of the image. For example, a neutral density of other optical filter can be mounted in front of the NVG. Typically, the light intensity may be reduced e.g. by a factor of at least hundred, thousand, or even more.

By mounting a perforated plate in front of the NVG, this provides the synergetic advantage that both the light intensity and the aperture of the NVGs can be decreased. By decreasing the aperture, this may increase the focal depth. A relatively large focal depth is advantageous for simulator systems based on a fixed distance to the projection screen. When the focal depth is too narrow, the lack of focus may become noticeable e.g. when the user moves his head with respect to the projection screen. For example, the perforated plate may be configured to reduce a total aperture of the night vision device by at least thirty percent, or between fifty to ninety percent, e.g. sixty percent. Instead of a single centred aperture also multiple apertures can be used spread across a surface of the perforated plate. By spreading multiple apertures, the effect of lowered luminance at the edge of the image may be reduced compared to a single aperture. By using a perforated plate in combination with an absorption or reflection based attenuation filter, the effect of the reduced aperture and reduced light intensity can be tuned more independently. By mounting the perforated plate between the optical filter and the NVGs, the aperture can be relative close to the NVG and/or internal reflections of the filter in the NVGs can be alleviated. Alternatively, or in addition, the optical filter can be mounted between the NVGs and the perforated plate or a second perforated plate.

By using a projector relatively large images can be provided on a screen having any shape, e.g. flat or curved. By configuring the projection screen as a dome, the simulation may be more realistic providing a surrounding view. The dome can be spherical, but also other shapes may be used, e.g. a collection of adjacent flat surfaces surrounding the user at different angles. By configuring the projection screen to fully enclose a user, it may be prevented that outside light leaks in. For example, projectors are placed inside the dome wherein the projection screen is configured to reflect the projected flight simulator image back to the user inside the dome. The projectors themselves can also be a source of scatter light e.g. if light exits the projectors via other means than the lens. To provide sufficient light also for day-flight simulation, the projection screen typically has a reflectivity for visible light of at least five, ten or twenty percent, for example thirty percent. The more reflectivity, the less light needs to be projected to provide a particular luminance. To prevent excess stray light, particularly in night-time simulation, the projection screen preferably has a reflectivity for (visible) light of at most sixty, fifty, or forty percent. Less reflectivity will result in better contrast. To provide more realistic images for night-flight simulation, the one or more light projectors and the projection screen are preferably configured to provide a contrast ratio higher than 20:1 e.g. for a white-black checkerboard projected in a central part of the flight simulator image. To provide a particular reflectivity, the projection screen is coated e.g. with grey paint.

The flight simulator system may comprise a cockpit and/or part of an airplane cabin. The cockpit may e.g. comprise a seat for the user. The dome or other shape screen may surround the seat. The cockpit of a flight simulator system typically comprises realistic flight controls, e.g. for steering, throttle, indicators, etcetera. In a night flight simulation, it can be important to adapt the flight controls such that the NVGs are not saturated, e.g. by light emanating from the indicators. For example, the adapted flight controls provide minimal emissions in an infrared wavelength range. To provide added realism, the cockpit may comprise or be situated on a moveable platform with actuators configured to tilt and/or shake the cockpit. For example, the platform is actuated under control of the flight simulator software.

According to further aspects of the present disclosure, there is provided a method for simulating night vision goggles aided night flight operations. The method may comprise calculating a flight simulator image, projecting the flight simulator image onto a projection screen, and measuring a viewing vector of a night vision device. The projected flight simulator image is masked as a function of the measured viewing vector to provide the benefits described herein. The method may be embodied also as software instructions on a computer readable medium, which when executed by a flight simulator system, cause the system to execute the method.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
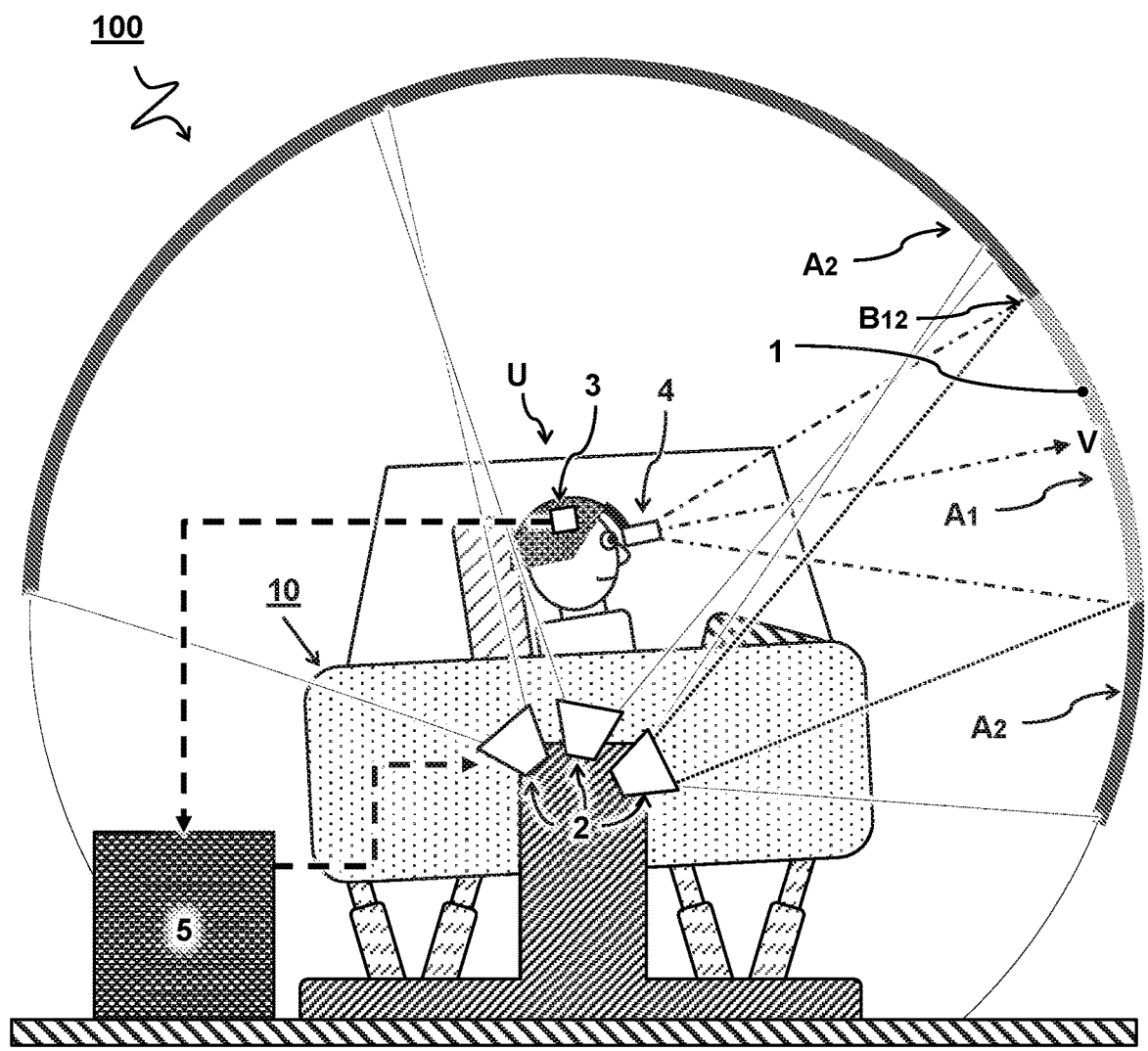
FIG. 1A shows a schematic side view of an embodiment for the flight simulator system and method.

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

A night vision goggles (NVG) or, more generally, a night vision device (NVD) is an optoelectronic device that allows images to be produced in low levels of light. The image may be a conversion to visible light of both visible light and near-infrared or even short wave infrared. Differences between an NVG image and a day-view image include for example the following. The field of view (FOV) of an NVG typically is limited e.g. to 40°. As a side-benefit, the limited FOV allows direct visibility of the cockpit instruments underneath the NVG. An aviator alternates his view through the NVG at the outside world and underneath his NVG at the cockpit instruments. The edge of a properly adjusted NVG is sharp, i.e. not 'fuzzy'. NVG resolution at optimal light levels is not much different from the naked eye, corresponding to ~2000 pixels over the width of the FOV. NVG contrast is substantially lower than CCD (daylight camera) contrast, in part because the NVG suffers from glare due to back-scattering off the micro-channel plate. Halos are visible examples of back-scatter glare. Light coming from a bright source is scattered into a 'halo': a perfectly circular spot surrounding the light. The depth-of-focus of an NVG is very small compared to the naked eye, implying that the NVG can only focus at a small range of distances simultaneously. NVGs react quickly at changes in light level, faster than cameras synced at 60 Hz. NVG response to fast temporal changes, like photon noise and rapid NVG rotations, therefore cannot be simulated fully with 60 Hz systems.

The present disclosure provides technology which may allow making high quality (Level D) NVG simulation possible and cheaper. In some embodiment, the technological combination comprises the limitation of the projected area to an area of e.g. forty degrees straight in front of the viewer plus a filter/aperture combination. The limitation of the projected area e.g. uses a head-tracker and the ability to dynamically limit the projected area in software. Complementary, commercially available technologies may include near-IR projection, rear-projection, laser-projection (all expensive) and low reflectivity paint (cheap). The head-tracking provides an extension to these technologies and in may some cases replace them. The present systems and method do not require expensive projection technologies to provide in higher contrast. For example, head-tracking provides a low-cost alternative to present technologies. Head-tracking enables enhanced contrast and dual-view; it may therefore replace two costly commercial technologies: rear-projection and near-IR projection. Head-tracking forms an attractive addition to standard projectors and to a standard front projection dome. For example, there is no need to resort to near-IR projectors to simultaneously present a dual-view image (near-IR NVG & visible night-views). Furthermore, there is no need to resort to rear projection to reach the extreme contrasts required to induce halos, saving on occupied space, image uniformity, installation cost, and maintenance costs The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
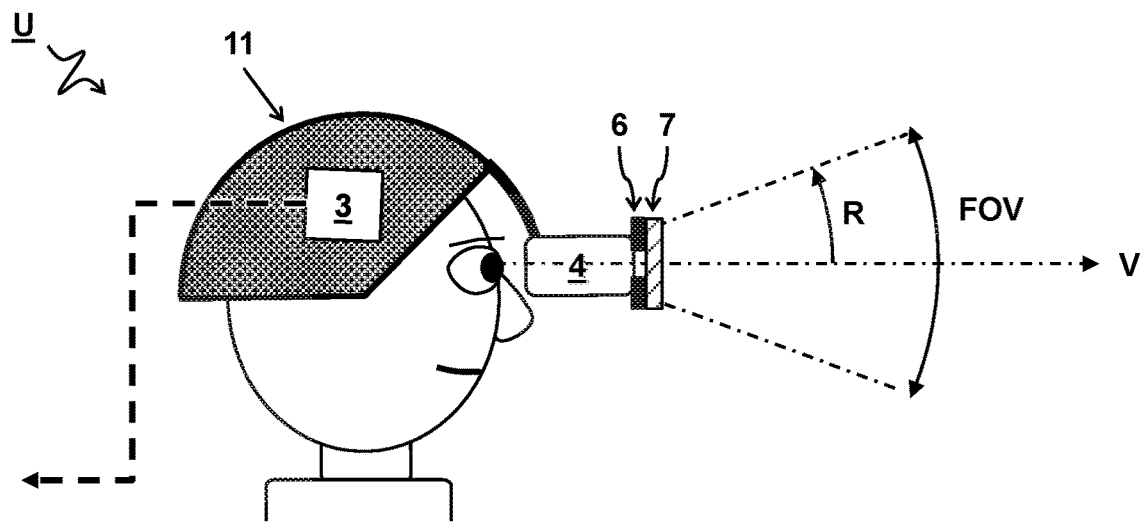
FIG. 1B shows a schematic side view of an embodiment of a helmet with tracking device and night vision goggles adapted for the simulator.

FIG. 1A shows a schematic side view of an embodiment of a the night vision goggles aided flight simulator system 100 for simulating night flight operations. FIG. 1B shows a schematic side view of an embodiment of a helmet 11 with tracking device 3 and night vision goggles 4 for use in the simulator system 100 of FIG. 1A.

The system 100 comprises a processor or computer 5 programmed with flight simulator software to calculate a flight simulator image. For example, the computer is configured or programmed with a computer readable medium having software instructions that when executed by the flight simulator system 100, cause the system to execute the methods as described herein. In one aspect, the present disclosure provides a method for simulating night vision goggles aided night flight operations. The method comprises calculating a flight simulator image A1,A2, projecting the flight simulator image A1,A2 onto a projection screen 1, and measuring a viewing vector V of a night vision device 4. In particular, the projected flight simulator image A1,A2 is masked as a function of the measured viewing vector V.

The system 100 comprises a projection screen 1 configured to receive the flight simulator image A1,A2. In one embodiment, the projection screen 1 is configured as a dome. In another or further embodiment, the projection screen 1 is configured to fully enclose a user U preventing outside light from leaking in. Preferably, the projection screen 1 is configured to reflect the projected flight simulator image A1,A2. In one embodiment, the projection screen 1 has a reflectivity for visible light of less than fifty percent. In another or further embodiment, the projection screen 1 has a reflectivity for visible light of more than five percent, more than ten percent, more than twenty percent, e.g. thirty-five percent. For example, the projection screen 1 is coated with grey paint. Accordingly, the system 100 is configured to provide a contrast ratio higher than 20:1 for a white-black checkerboard projected in a central part A1 of the flight simulator image.

The system 100 comprises one or more light projectors 2 configured to project the flight simulator image A1,A2 onto the projection screen 1. In one embodiment, the light projector 2 is a visible ('RGB') light projector. For example, the flight simulator software is configured to simulate (mimic) an infrared (e.g. near infrared) image as viewed through the night vision device 4 by generating a flight simulator image A1,A2 comprising red visible light. This has an advantage that only visible light projectors are needed. The simulated infrared image may comprise (relatively bright) red colors to stimulate the night vision goggles, e.g. near a limit of its spectral sensitivity range to generate a perceived image through the NVG as if it were an infrared image. To prevent stray light, the simulated infrared image may only be projected at the central part A1 of the flight simulator image. To allow a user also a view outside the night vision device 4, the night time image as seen by the naked eye (i.e. NOT through the NVG) may optionally be projected at/in the peripheral part A2 of the flight simulator image. In another or further embodiment, the light projector 2 comprises an infrared light projector. Preferably, the light projector 2 is at least a 10 bit projector, i.e. is configured to project at least 2^10 distinct light intensities.

The system 100 comprises a view tracking device 3 configured to measure a viewing vector V and/or viewing area of a night vision device 4. For example, the viewing vector V is directed in a centre of a user's field of view looking through the night vision device 4. For example, the viewing vector V is measured with respect to the projection screen 1. In one embodiment, the view tracking device 3 is a head tracking device configured to measure the viewing vector V of the user's head U. Typically, the night vision device 4 is worn on a user's head U. In one embodiment, the view tracking device 3 is configured to be mounted on a helmet 11 comprising the night vision device 4. In another or further embodiment, the view tracking device 3 is configured to measure a view vector and view position of the night vision device 4. Preferably, the view tracking device 3 is configured to measure the viewing vector V wirelessly.

The system 100 is configured to mask the projected flight simulator image A1,A2 as a function of the measured viewing vector V. In one embodiment, the masking comprises dividing the projected flight simulator image A1,A2 into a central part A1 that is in a FOV according to the viewing vector V, and a peripheral part A2 that is outside the FOV (Area A1 in FIG. 1A).

In a preferred embodiment, the central part A1 of the flight simulator image A1,A2 is projected with an increased brightness with respect to an intended brightness. In other words, the amount of light (luminance) involved with projecting the central part A1 is increased. In another or further embodiment, the peripheral part A2 is projected with/at the 'normal' night level i.e. at a relatively low brightness, or not projected at all. This may reduce an amount of indirect light scattering of the peripheral part A2 into the night vision device 4. In another or further embodiment, the increased brightness of the central part A1 is reduced back to the intended brightness before entering the night vision device 4 by suitable light reduction means, e.g. by a perforated plate 6 and/or light reduction filter 7 mounted between the projection screen 1 and the night vision device 4. Accordingly, any remaining indirect light originating from the peripheral part A2 and scattering (via the central part A1) into the night vision device 4 may be further reduced thereby increasing contrast of the central part A1 as viewed through the night vision device 4.

In some embodiments, a brightness of light (e.g. in a range visible through the night vision device 4) is increased in the central part A1 with respect to an intended brightness of the calculated flight simulator image, e.g. increased by a predetermined factor. For example, a simulate image is intended to have a particular brightness or luminance which would normally be perceived as a realistic image. This intended luminance is increased before being projected in the central part A1 such that this part actually has a higher brightness than would normally be realistic. For example, the luminance of the central part A1 may be scaled up by a predetermined factor.

In a further embodiment, the perforated plate 6 and/or light reduction filter 7 is/are configured to reduce light entering the night vision device 4 by a corresponding predetermined factor to obtain the intended brightness of a night vision image for a user of the night vision device 4. In other words, the amount of light actually reaching the NVG (past the filter/aperture) is substantially the same as intended according to a realism of the simulation because this amount is first increased in the projection A1 and then decreased by the filter/aperture. For example, the predetermined factor is at least ten, at least twenty, or even at least hundred. It will be appreciated that the light scattered from the peripheral area A2 into the central area A1 is also decreased by the filter/aperture while this region was projected with normal brightness or not projected at all. Accordingly, this may effectively increase contrast of the image of A1 over stray light coming from the area A2.

In another or further embodiment, when projector brightness is insufficient, it may be of benefit to simulate certain effects associated with high brightness objects. For example, in one embodiment, the flight simulator software is configured to simulate effects such as halo rings around objects having a relatively high brightness as viewed through the night vision device 4. Accordingly, these effects, e.g. simulated halo rings, may be projected in the central part A1 of the flight simulator image A1,A2.

In another or further embodiment, the system is configured to calculate a boundary B12 separating a central part A1 and a peripheral part A2 of the projected flight simulator image A1,A2. For example, the boundary B12 is calculated as a function of the measured viewing vector V and a predetermined field of view FOV in a radial area R around the viewing vector V. Preferable, a radial extent R of the field of view FOV of the central art A1 can be adjusted in the flight simulator software.

In one embodiment, the system comprises or works together with a night vision device 4 restricting a user's field of view (FOV). For example the field of view is between twenty and sixty degrees. Accordingly, the projected flight simulator image A1,A2 may be divided in a central part A1 that is inside an area corresponding to the field of view of the night vision device 4 and a peripheral part A2 that is outside the field of view of the night vision device 4. In another or further embodiment, the night vision device 4 is a binocular or bi-ocular device restricting a user's field of view in both eyes. Also single view devices can be used.

In one embodiment, the masking comprises reducing a relative brightness of a peripheral part A2 of the flight simulator image A1,A2 relative to a central part A1 surrounded by the peripheral part A2. For example, the masking is effected by controlling the light projector 2 to selectively project the flight simulator image A1,A2 with reduced brightness or luminance in a peripheral part A2 thereof. For example, very little or no light at all is projected outside the central part A1.

In one embodiment, a perforated plate 6 mounted in front of the night vision device 4 for reducing an aperture of the night vision device 4. In a further embodiment, the perforated plate 6 is configured to reduce a total or numerical aperture of the night vision device 4 by at least twenty percent, thirty percent, between fifty to ninety percent, e.g. sixty percent. For example an aperture between two and ten millimeter is used, e.g. five millimeter (depending on the original aperture of the NVG).

In another or further embodiment, the perforated plate comprises a plurality of apertures spread across a surface of the perforated plate. Alternatively, or in addition, a light reduction filter 7, e.g. neutral density filter, is mounted in front of the night vision device 4 for reducing a light intensity into the night vision device 4. For example, the light reduction filter 7 possibly in combination with the perforated plate 6 is configured to reduce visible light intensity passing there through by a factor of at least ten or more. In another or further embodiment, the perforated plate 6 is mounted between the night vision device 4 and the light reduction filter 7.

In the embodiment shown, the system 100 comprises a cockpit 10 for seating a user U. Typically, the cockpit 10 comprises flight controls adapted for use with the night vision device 4. In one embodiment, the flight controls provide minimal emissions in a near-infrared wavelength range. In another or further embodiment, the cockpit 10 comprises a moveable platform with actuators configured to tilt the cockpit 10. For example, the platform is actuated under control of the flight simulator software.

Figure 2A:
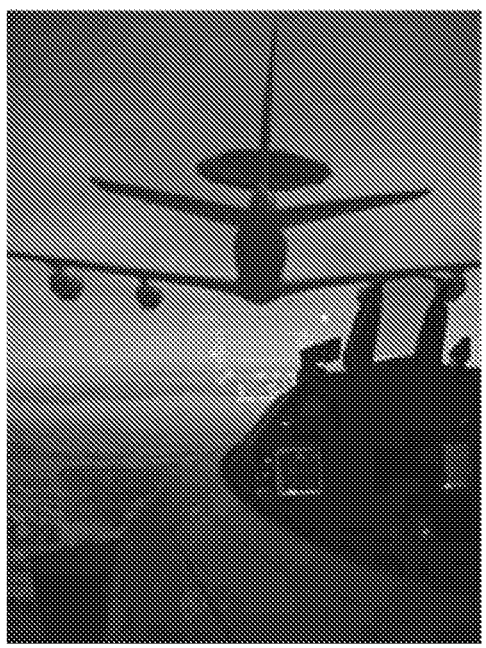
FIG. 2A shows a simulator image without night vision goggles.
Figure 2B:
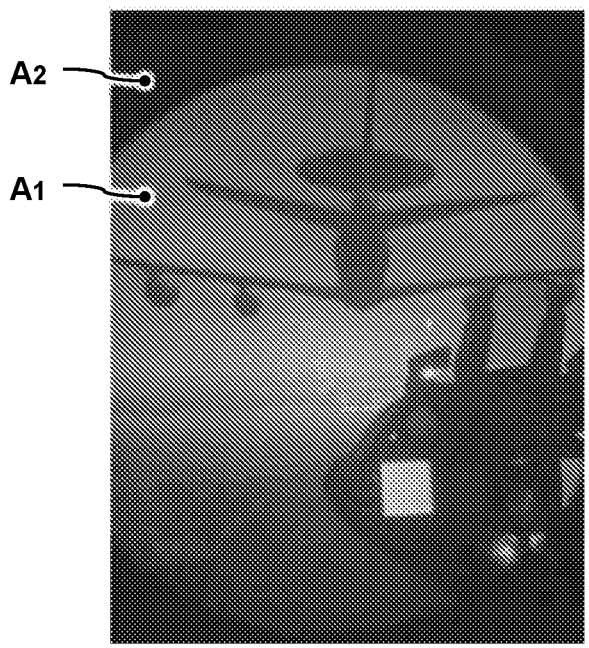
FIG. 2B shows a simulator image as viewed through night vision goggles.
Figure 2C:
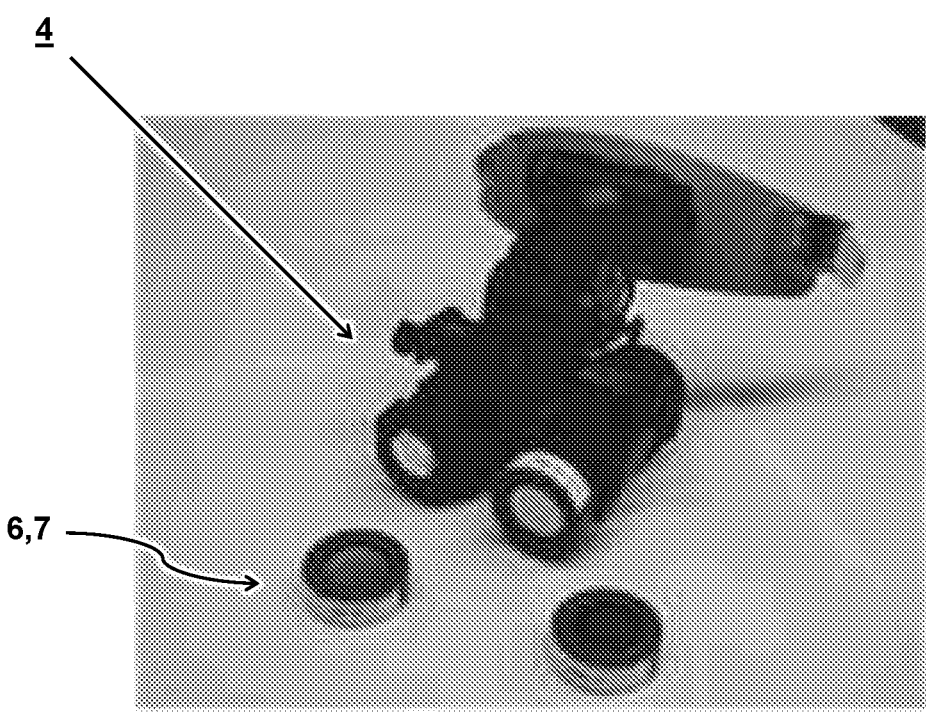
FIG. 2C shows an example of night vision goggles with filters.

FIG. 2A shows a long exposure view of a simulator image without night vision goggles. FIG. 2B shows a simulator image as viewed through night vision goggles. FIG. 2C shows an example of night vision goggles 4 with combined optical filter/aperture 6,7. It may be noted that the NVG view of FIG. 2B has a restricted field of view dividing the central image part A1 from the peripheral part A2 which is not visible when viewed through the night vision device. It may also be noted that near infrared emissions from the cockpit instruments are particularly visible.

For the purpose of clarity and a concise description, features are described herein as part of the same or separate embodiments, however, it will be appreciated that the scope of the invention may include embodiments having combinations of all or some of the features described. For example, while embodiments were shown for a projection screen, also other displays may be envisaged by those skilled in the art having the benefit of the present disclosure for achieving a similar function and result. E.g. electrical and optical components may be combined or split up into one or more alternative components. The various elements of the embodiments as discussed and shown offer certain advantages, such as increasing contrast in a NVG aided simulator system. Of course, it is to be appreciated that any one of the above embodiments or processes may be combined with one or more other embodiments or processes to provide even further improvements in finding and matching designs and advantages. It is appreciated that this disclosure offers particular advantages to night vision view of a flight simulation, and in general can be applied for any application wherein images are viewed in a restricted field of view.

While the present systems and methods have been described in particular detail with reference to specific exemplary embodiments thereof, it should also be appreciated that numerous modifications and alternative embodiments may be devised by those having ordinary skill in the art without departing from the scope of the present disclosure. For example, embodiments wherein devices or systems are disclosed to be arranged and/or constructed for performing a specified method or function inherently disclose the method or function as such and/or in combination with other disclosed embodiments of methods or systems. Furthermore, methods that can be embodied as program instructions, e.g. on a non-transient computer-readable storage medium, are considered inherently disclosed as such embodiment.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A night vision goggles aided flight simulator system for simulating night flight operations, the system comprising:
   a computer programmed with flight simulator software to calculate a flight simulator image;
   a projection screen configured to receive the flight simulator image;
   a light projector configured to project the flight simulator image onto the projection screen; and
   a view tracking device configured to measure a viewing vector of a night vision device;
   wherein the system is configured to perform a masking of the flight simulator image as a function of the measured viewing vector, wherein the masking comprises dividing the flight simulator image into:
      a central part that is in a field of view around the viewing vector, and
      a peripheral part that is outside the field of view;
   wherein the central part of the flight simulator image is projected with an increased brightness with respect to an intended brightness, while the peripheral part is either projected with a relatively low brightness corresponding to an actual nightly light level or not projected at all to reduce an amount of indirect light scatter of the peripheral part into the central part and into the night vision device;
   wherein the increased brightness of the central part is reduced back to the intended brightness before entering the night vision device by a perforated plate and/or light reduction filter mounted between the projection screen and the night vision device, wherein simultaneously any remaining indirect light scattering of the peripheral part into the night vision device is further reduced thereby increasing contrast of the central part as viewed through the night vision device.

2. The system according to claim 1, wherein a brightness in a range visible through the night vision device is increased by a predetermined factor in the central part with respect to an intended brightness of the flight simulator image calculated by the flight simulator software; and
   wherein the perforated plate and/or light reduction filter is/are configured to reduce light entering the night vision device by a corresponding predetermined factor to obtain the intended brightness of a night vision image for a user of the night vision device.

3. The system according to claim 2, wherein the predetermined factor in the central part is at least ten.

4. The system according to claim 1 wherein the projection screen is configured to reflect the flight simulator image projected from the light projector, wherein the projection screen has a reflectivity for light between twenty and fifty percent.

5. The system according to claim 1, wherein the light projector is a visible light projector, and
   wherein the flight simulator software is configured to simulate an infrared image as viewed through the night vision device by generating a flight simulator image comprising red visible light.

6. The system according to claim 5, wherein the flight simulator software is configured to simulate the infrared image for the visible light projector at the central part of the flight simulator image while providing a normal visible image at the peripheral part of the flight simulator image.

7. The system according to claim 1, wherein the system is configured to calculate a boundary separating a central part and a peripheral part of the projected flight simulator image, wherein the boundary is calculated as a function of the measured viewing vector and a predetermined field of view in a radial area around the viewing vector.

8. The system according to claim 1, wherein a radial extent of the field of view of the central part is adjustable in the flight simulator software.

9. The system according to claim 1, wherein the view tracking device is configured to be mounted on a night vision device or on a helmet comprising the night vision device, and
   wherein the view tracking device is configured to transmit the viewing vector wirelessly to the computer.

10. The system according to claim 1, further comprising a night vision goggles that restrict a user field of view, wherein the flight simulator image projected by the light protector is divided into:
    a central part that encompasses the user field of view of the night vision goggles, and
    a peripheral that is outside the user field of view of the night vision goggles.

11. The system according to claim 1, wherein the perforated plate comprises a plurality of apertures spread across a surface of the perforated plate.

12. The system according to claim 1, wherein the perforated plate is mounted between the night vision device and the light reduction filter.

13. The system according to claim 1, wherein the flight simulator software is configured to:

simulate halo rings around objects having a relatively high brightness as viewed through the night vision device, and project the simulated halo rings only in the central part of the flight simulator image.

14. A method for simulating night vision goggles aided night flight operations, the method comprising calculating a flight simulator image;

projecting the flight simulator image onto a projection screen; and measuring a viewing vector of a night vision device;

wherein the flight simulator image projected onto the projection screen is masked as a function of the measured viewing vector, wherein the masking comprises dividing the flight simulator image into:

a central part that is in a field of view around the viewing vector, and a peripheral part that is outside the field of view;

wherein the central part of the flight simulator image is projected with an increased brightness with respect to an intended brightness, while the peripheral part is either projected with a relatively low brightness corresponding to an actual nightly light level or not projected at all to reduce an amount of indirect light scatter of the peripheral part into the central part and into the night vision device;

wherein the increased brightness of the central part is reduced back to the intended brightness before entering the night vision device by a perforated plate and/or light reduction filter mounted between the projection screen and the night vision device, wherein simultaneously any remaining indirect light scattering of the peripheral part into the night vision device is further reduced thereby increasing contrast of the central part as viewed through the night vision device.

15. A non-transitory computer readable medium with software instructions that when executed by a flight simulator system, cause the system to execute a method comprising:

calculating a flight simulator image;

projecting the flight simulator image onto a projection screen; and measuring a viewing vector of a night vision device;

wherein the projected flight simulator image projected onto the projection screen is masked as a function of the viewing vector, wherein the masking comprises dividing the flight simulator image into:

a central part that is in a field of view around the viewing vector, and a peripheral part that is outside the field of view;

wherein the central part of the flight simulator image is projected with an increased brightness with respect to an intended brightness, while the peripheral part is either projected with a relatively low brightness corresponding to an actual nightly level or not projected at all to reduce an amount of indirect light scatter of the peripheral part into the central part and into the night vision device;

wherein the increased brightness of the central part is reduced back to the intended brightness before entering the night vision device by a perforated plate and/or light reduction filter mounted between the projection screen and the night vision device, wherein simultaneously any remaining indirect light scattering of the peripheral part into the night vision device is further reduced thereby increasing contrast of the central part as viewed through the night vision device.

\* \* \* \* \*